United States Patent [19]

Grourke et al.

[11] 4,243,416

[45] Jan. 6, 1981

[54] CORROSION-INHIBITING METHOD USING LATEX PAINTS AND ARTICLE

[75] Inventors: Martin J. Grourke, Lansdale; Roy W. Flynn, Chalfont, both of Pa.

[73] Assignee: Rohm and Haas Company, Philadelphia, Pa.

[21] Appl. No.: 620,685

[22] Filed: Oct. 8, 1975

Related U.S. Application Data

[63] Continuation of Ser. No. 412,234, Nov. 2, 1973, abandoned, which is a continuation-in-part of Ser. No. 296,466, Oct. 10, 1972, abandoned.

[51] Int. Cl.$^3$ .......................... C08J 3/00; C09K 3/00
[52] U.S. Cl. ................................ 106/14.13; 106/14.28; 260/29.2 EP; 260/29.6 R; 428/458; 428/461
[58] Field of Search .................. 106/14; 260/29.2 EP, 260/29.2 E, 29.6 MM; 428/458, 461; 427/388 C, 385 R, 409, 413

[56] References Cited

U.S. PATENT DOCUMENTS

| | | | |
|---|---|---|---|
| 2,760,886 | 8/1956 | Prentiss | 427/388 C |
| 2,902,390 | 9/1959 | Bell | 427/388 C |
| 2,904,526 | 9/1959 | Velzmann | 260/23 |
| 3,079,358 | 2/1963 | Velzmann | 260/29.6 M |
| 3,280,050 | 10/1966 | Johnson et al. | 260/29.6 MM |
| 3,931,085 | 1/1976 | Drelich et al. | 260/29.6 M |

*Primary Examiner*—Theodore Morris
*Attorney, Agent, or Firm*—Robert A. Doherty

[57] ABSTRACT

The method of modifying latex paints for maintenance paint applications, primarily on iron or steel industrial and transportation structures, in order to provide both short term and long term corrosion resistance, and the resulting composition, are described. Two types of corrosion encountered in painting ferrous surfaces with latex paint are: (1) flash rusting which occurs as a result of contact with the water from the latex and results in rust bleed-through at the time the paint is drying, and (2) rust bleeding, which may occur over a period of months or years. It has now been found that the benefits of both water soluble corrosion inhibitors, for preventing flash rusting, and water insoluble corrosion inhibitors, for minimizing blistering and rust bleeding, are achieved by utilizing a soluble complex of a polyvalent metal, a volatile complexing agent, and a corrosion inhibiting anion. This complex may be represented by the formula $$M(Z)_x An$$

where M is the metal cation, An is the corrosion inhibiting anion, Z is the complexing volatile component, and x is the number of moles of volatile complexing agent per mole of M, being a coordination complex, x typically ranges from 2 to 6, depending upon the quantity of volatile complexing agent present, all as is well known in the art of coordination chemistry. Examples are zinc ammonium carbonate and zinc ammonium molybdate.

16 Claims, No Drawings

CORROSION-INHIBITING METHOD USING LATEX PAINTS AND ARTICLE

This is a continuation of Ser. No. 412,234 filed Nov. 2, 1973, now abandoned; which is a continuation-in-part of Ser. No. 296,466, filed Oct. 10, 1972, now abandoned.

The present invention is concerned with aqueous dispersions of addition polymers which are adapted for use as coating compositions and which are characterized by outstanding properties including improved adhesion to various substrates, especially metal, particularly ferrous, surfaces, either bright, partly or wholly primed, or corroded over part or all of their exposed areas including rusty iron from which only the loose rust has been removed, as by a wire brushing or other mechanical action.

Any water-based paint for maintenance coating of metals such as bridges, ships, metal pipes and railings, subway and like structures, metal buildings, pipes and conduits for conveying fluids, storage tanks, and the like is benefited by the discovery of this invention. Examples of these known latices are emulsion polymers of vinyl acetate, styrene, styrene-butadiene, vinyl acetate-vinyl chloride, acrylonitrile-butadiene, butadiene, isoprene, vinylidene chloride-acrylonitrile, vinylidene chloride-vinyl acetate, vinyl chloride-acrylonitrile, acrylic acid ester and methacrylic acid ester polymers and copolymers thereof with other vinyl monomers, carboxylated synthetic and natural rubbers, and so forth. Other useful and well-known water-based paints include the epoxies, alkyds, phthalic alkyds, emulsified drying oils, polystyrene, and the like. The nature of the film-former and paint are immaterial to the invention; any water-based paint, particularly coatings for ferrous metals, is beneficiated by the present invention.

The most important of these dispersions used in making water-based paints are polymers, including homopolymers and copolymers of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene, and aliphatic dienes, such as butadiene, isoprene, and chloroprene.

Poly(vinyl acetate) and copolymers of vinyl acetate with one or more of the following monomers: vinyl chloride, vinylidene chloride, styrene, vinyltoluene, acrylonitrile, methacrylonitrile, one or two of the acrylic and methacrylic acid esters mentioned above are well known as the film-forming component of aqueous base paints. Similarly copolymers of one or more of the acrylic or methacrylic acid esters mentioned above with one or more of the following monomers: vinyl acetate, vinyl chloride, vinylidene chloride, styrene vinyl-toluene, acrylonitrile, and methacrylonitrile are also more or less conventionally employed in aqueous base paints. Homopolymers of ethylene, isobutylene, and styrene, and copolymers of one or more of these hydrocarbons with one or more esters, nitriles or amides of acrylic acid or of methacrylic acid or with vinyl esters, such as vinyl acetate and vinyl chloride, or with vinylidene chloride are also used. The diene polymers are generally used in aqueous base paints in the form of copolymers with one or more monomers following: styrene, vinyl-toluene, acrylonitrile, methacrylonitrile, and the above-mentioned esters of acrylic acid or methacrylic acid. It is also quite common to include a small amount, such as ½ to 5 percent or more, of an acid monomer in the monomer mixture used for making the copolymers of all of the general types mentioned above by emulsion polymerization. Acids used include acrylic, methacrylic, itaconic, aconitic, citraconic, crotonic, maleic, fumaric, the dimer of methacrylic acid, and so on. Other copolymerizable monoethylenically unsaturated molecules containing about ½ to 15 percent, and preferably 1 to 5 percent, by weight of monomers having a polar group selected from the group consisting of alcoholic hydroxyl, amino, carboxylic acid amide, and ureido and also useful. All of these groups are capable of enhancing the adhesion of the compositions to particular substrates depending upon the particular polar group involved. Again they also favor the receptivity to and adhesion of various subsequently applied coating compositions, the nature of the subsequently applied compositions so favored being dependent on the particular polar group. Besides adhesion, other properties may also be favorably influenced. For example, the compositions in which the polar group is an amino group tend to inhibit the development of rust over long periods of time even in atmospheres of high humidity and acidity. Thus, the resistance to rusting, the adhesion to a given substrate, or other property is improved over the corresponding property obtainable from a corresponding composition in which the above-mentioned polar monomer is omitted.

These aqueous dispersions may be made using one or more emulsifiers of anionic, cationic, or non-ionic type. Mixtures of two or more emulsifiers regardless of type may be used, except that it is generally undesirable to mix a cationic with an anionic type in any appreciable amounts since they tend to neutralize each other. The amount of emulsifier may range from about 01. to 6 percent by weight or sometimes even more, based on the weight of the total monomer charge. When using a persulfate type of initiator, the addition of emulsifiers is often unneccessary and this omission or the use of only a small amount, e.g., less than about 0.5 percent, of emulsifier, may sometimes be desirable from the cost standpoint (elimination of expensive emulsifier), and less sensitivity of the dried coating or impregnation to moisture, and hence less liability of the coated substrate to be affected by moisture, which, for instance, would produce coatings less liable to swelling or softening, particularly when subjected to humid atmospheres. The average particle size or diameter of these dispersed polymers may be from about 0.03 to 3 microns or even larger. Polymodal particle size combinations, such as taught by U.S. Pat. No. 3,356,627 to Scott, are particularly useful. The latices of U.S. Pat. No. 2,760,886 to Prentiss et al are also useful. The particle size, whenever referred to herein, is the "weight average diameter." This number, expressed in microns, is determined using the ultra-centrifuge. A description of the method can be found in the Journal of Colloid Science 15, pp. 563 to 572, 1960 (J. Brodnyan). In general, the molecular weight of these emulsion polymers are high, e.g., from about 100,000 to 10,000,000 viscosity average, most commonly above 500,000.

Heretofore metals have been protected from corrosion by the application of primers comprising certain corrosion-protective pigments in non-aqueous vehicles based on a drying oil such as linseed oil, a fast drying varnish base comprising natural resins or a mixture of natural and synthetic resins, or an alkyd base modified with a urea-, melamine-, or phenol-formaldehyde resin. Such coating compositions contain volatile solvents frequently of inflammable character and often of a type which gives off polluting fumes during the coating operation. To cope with the fire and health hazards, protection is usually provided in the way of solvent recovery systems.

In the painting of metal surfaces, aqueous systems have usually been avoided because of the known tendency of water to initiate corrosion of the metal, especially such common metals as iron and steels which make up the bulk of the metal products that are provided with protective coatings of this sort. The initiation of corrosion and the development of rust, and oxides of iron and steels particularly, is contrary to the purpose of applying corrosion-protective primers; and the production of minute oxidized points or areas on the surface of the metals being primed generally has the effect of reducing adhesion and durability of coatings applied over such oxidized points.

In painting metals with latex paints, particularly steel or rusty steel, different types of corrosion are encountered. One type of corrosion is that which occurs as a result of contact with the water in the latex paint itself. For example, if a rusty surface is painted and the drying time covers a long period of time, corrosion products become trapped in the surface of the dry paint film. This is called "flash rusting." After application and drying of the paint, corrosion or staining which is commonly encountered results in "rust bleeding" of corrosion products to the surface of the paint film. Another difficulty encountered is blistering, on a painted surface which has been properly prepared, which is believed to be caused primarily by water-soluble materials in the paint becoming solubilized and causing a lifting of the paint film from the metal.

In the past, flash rusting has been prevented by utilizing water-soluble salts such as sodium dichromate, sodium nitrite, sodium borate, sodium carbonate, and so forth. These compounds can cause defects in maintenance properties in that blistering and rust bleeding can readily occur when the surface is subjected to water or salt spray. In other words, where the cation is water soluble and non-volatile, the water sensitivity of the paint is increased. It is also known to use relatively insoluble salts such as basic lead silicochromate to confer the long term maintenance properties of resistance to blistering and resistance to rust bleeding. These insoluble compounds, however, have little or no effect upon flash rust resistance becasue of their water insolubility. In other words, as the solubility of the corrosion inhibitor increases the flash rust resistance is improved, and as the solubility of the corrosion inhibitor decreases, within limits, the maintenance properties improve.

In accordance with the present invention, it has now been found that when a corrosion inhibitor in which the cation forms water-insoluble salts with the corrosion inhibiting anion are introduced into water-based paint in the form of a water-soluble complex of a volatile complexing agent, the objectives of achieving flash rust resistance and resistance to rust bleeding and blistering are accomplished. The reason is that, being soluble, the complex provides corrosion inhibiting anions to provide flash rust resistance, and once the volatile complexing agent evaporates, the insoluble metal salt provides long term maintenance properties. The complex may be represented by the formula:

$$M(Z)_x An$$

where M is a polyvalent metal ion, An is a corrosion inhibiting anion, Z is a volatile complexing agent, and x is the number of moles of Z per mole of M, being a coordination complex, x typically ranges from 2 to 6, depending upon the quantity of volatile complexing agent present, all as is well known in the art of coordination chemistry. The following alterntives are useful:

| M | Z | | An |
|---|---|---|---|
| Sc | Cu | :NR$_3$ where the R groups can be the | CO$_3$= |
| Ti | Zn | same or different and can be hydrogen or organic groups, e.g.; | PO$_4$≡ |
| V | Zr | NH$_3$, | |
| Cr | Pd | NH$_2$CH$_3$, NH(CH$_3$)$_2$ | HPO$_4$= |
| Mn | Ag | :OR$_2$ where the R groups can be the | WO$_4$= |
| Fe | Cd | same or different and can be hydrogen or organic group, e.g., CH$_3$OH | MoO$_4$= |
| Co | Pt | :SR$_2$ where the R groups can be the | C$_6$H$_5$COO$^-$ |
| Ni | Au | same or different and can be hydrogen or organic groups, e.g., | SiO$_3$= |
| | Hg | H$_2$S, CH$_3$SH | |
| | | | B$_4$O$_7$= |
| | | | CrO$_4$= |

Of course, in the case where An is monovalent, or M is other than divalent, the quantity of M and An will vary accordingly. It will be noted that the metals are polyvalent transition metals, the complexing agents are well-known materials, and the corrosion inhibiting anions are well-known materials. It is to be emphasized that not all combinations included in the above table or formula would be useful to inhibit long-term resistance to rust bleeding and blistering. For example, zinc nitrite is water soluble, and thus zinc ammonium nitrite, even if the latter did prevent flash rust resistance, would not be useful for conferring maintenance properties upon the paint. In the above table, R can be hydrogen, alkyl, or hydroxyalkl of from one to four carbon atoms.

In general, any polyvalent metal and any corrosion inhibiting anion may be used which will form a soluble complex with the volatile complexing agent and which forms a substantially water-insoluble compound upon evaporation of the complexing agent. Herein, where "substantially water insoluble" or similar language is used with regard to the ionic compound of the polyvalent metal and the corrosion inhibiting anion, it is intended that the solubility of such compounds shall be no more than about 4 grams in 100 cubic centimeters of water at 20° C., preferably no more than 1 gram per 100 cubic centimeters, and still more preferably no more than 0.1 grams per 100 cubic centimeters of water.

Of course, water-insoluble corrosion inhibitors can be used along with the water-soluble complexes, but they are not necessary.

The mode of addition of the complex to the paint or to one of the components thereof, such as the pigmented dispersion or the latex, can be accomplished in various ways. The polymer particles of the latex are insoluble in water and in dilute aqueous acid or alkaline solutions having a pH of from about 3 to about 10, and the complex can be added to the latex and dissolved therein either as a powder or as a preformed solution. Where ammonia is the volatile complexing agent, the dispersion is generally made alkaline with ammonia and usually with a pH of from about 7.5 to about 9.5. While preformed complexes such as zinc ammonium carbonate and zinc ammonium molybdate can be added to the latex, they may be formed in situ. Thus, zinc oxide, ammonium carbonate, and ammonia have been added to the dispersion to form the complex zinc ammonium carbonate in situ. Similarly, ammonium molybdate, zinc oxide, and ammonia are added to form zinc ammonium molybdate in situ in the latex. Of course, where zinc oxide or the like is included as a paint pigment, all that need be added is a soluble compound of the corrosion inhibiting anion and the volatile complexing agent such as ammonia.

Preferred metals are zinc, cadmium, and zirconium. The preferred volatile complexing agents are ammonia or the volatile amines such as methyl amine, ethyl amine, dimethyl amine, diethyl amine, triethyl amine, morpholine, ethanol amine, diethanol amine, triethanol amine, etc. The complexing agent is as volatile or more volatile than water, the rate of evaporation preferably being from about the same as that of water to about twice as fast as water. Preferred anions are carbonate and molybdate.

The quantity of water soluble of the polyvalent metal, the volatile complexing agent, and the corrosion inhibiting anion depends primarily upon the quantity of water in the latex paint. Particularly as regards flash rust inhibition, the more water that is present (and thus the longer it takes to evaporate), the larger the quantity of soluble complex is needed, assuming constant ambient conditions of temperature, wind, humidity, and the like. A suitable range of soluble complex is from 0.2 to 20 millimoles of complex per mole of water. More than this amount of complex can be utilized, but the benefits are not necessarily commensurate with the optimum expense for the paint. Different corrosion inhibiting anions require different amounts of the complex. For instance, the carbonate anion requires a somewhat larger amount of soluble complex than does the molybdate ion. Thus, a preferred range of complex for zinc ammonium molybdate is from about 1 millimole to about 5 millimoles per mole of water, whereas the optimum range for zinc ammonium carbonate runs from about 3 millimoles to about 10 millimoles per mole of water. The water soluble complex may be added to the latex or may be included in the paint formulation. The manner of addition is not critical; it may be added as a solution, as a paste, or as a dry powder.

Pigment compositions used in exterior paints usually comprise hiding white-pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used in pigmenting the paint compositions. Typical useful white hiding pigments are: rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred.

While the indicated pigmentation can be solely of hiding prime pigments, it is economically impractical to use solely prime pigments at the indicated high pigment volume concentration. As is ordinary practice in paint formulation, the total pigment usually consists of hiding prime pigments extended with well-known pigment extenders such as calcium carbonate, gilders whiting talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white paints and light tints thereof have a pigment composition whereof the extender pigment is present in the weight proportion of 0.4 to 4 parts per part of hiding prime pigment.

Pigments can be dispersed in the aqueous paint vehicle by any of the well-known techniques of pigment dispersion in paint formulation, such as roller milling, ball or pebble grinding, sand grinding as described in Hochberg U.S. Pat. No. 2,581,414, paddle-mixer dispersion techniques, Werner-Pfleiderer "dough" mixer mixing and other pigment paste techniques. The pigments can be dispersed in the aqueous dispersion polymer compositions or the pigments can be wet and dispersed in a separate aqueous slurry in the absence of the pertinent polymer components and then combined with the aqueous dispersion polymer by simple mixing. The order of combining the pigments is not significantly critical. The pigment composition is preferably dispersed in the presence of a water-soluble and swelling colloidal bodying agent and an auxiliary surfactant in addition to the surfactants present to stabilize the polymer dispersions. The auxiliary surfactant for dispersing the pigment composition can be non-ionic, anionic, or cationic, preferably of the water-soluble type. The selection of this dispersing surfactant is judicious to provide compatibility and non-reactivity with the polymer dispersion stabilizing surfactants. The surfactant for dispersing the pigment composition may be the same or different from the stabilizing surfactants of the polymer. Ordinarily a concentration of up to 2 percent of the auxiliary pigment dispersing surfactant based on the weight of the pigment composition is adequate, the preferred concentration being 0.1 percent to 1 percent on the indicated basis. It is preferred that the total amount of pigment dispersing surfactant and the polymer stabilizing surfactants do not exceed 10 percent based on the total weight of polymer solids.

The rheological characteristics of the paint can be varied to suit the application needs. The presence of combined carboxylic acid units in the copolymers are helpful in altering the rheological characteristics, particularly when carboxylic substituents are reacted with ammonium hydroxide to form the ammonium carboxylate of the ester copolymer. The aqueous dispersion paint ordinarily is adjusted to an alkaline state of 7.5 to 10 pH with ammonium hydroxide. When the polymers do not contain combined carboxylic or carboxylate units, there may be added to the compositions such substances as polyacrylic acid, polymethacrylic acid, water-soluble or water swellable copolymers of acrylic acid or methacrylic acid, or water-soluble and water-swellable carboxylates of copolymers of these acids to modify the rheological characteristics. Water-soluble cellulose derivatives such as methyl cellulose, carboxymethyl cellulose or hydroxyethyl cellulose, especially methyl cellulose, can also be used for bodying purpose. These materials are used in their ordinary small effective proportions.

Another desirable ancillary component which is preferentially present in the aqueous dispersion paint composition is a volatile water-soluble organic anti-freeze agent to provide the aqueous paint with freeze-thaw stability. Ethylene glycol is especially useful for this purpose at concentrations up to about 5 percent by weight of the total composition. Other glycols and polyglycols can be used for this purpose.

Aqueous dispersion paint compositions containing surfactants ordinarily foam unless section of the dispensants is specifically directed to the inherently non-foaming species. Anti-foam agents are ordinarily included in the aqueous paint formulation to minimize foaming. High boiling alcohols, polyglycols, silicone liquids and other anti-foam agents well known to the coating art can be included in the composition as an ancillary component.

The paints coalesced from the invention composition may exhibit fungus attack and, therefore, it is further desirable to include a preservative or fungicidal agent in the paint. Any of the well-known preservative agents used in paint formulations can be used in their usual small effective proportions. Phenyl mercury oleate and other phenyl mercurial fungicides are useful at active concentrations from 0.05 to 0.3 percent by weight of the composition. Other recently developed non-mercurials are also useful.

The paint compositions of this invention ordinarily are adequately flexible that the external plasticization of the polymer is unnecessary. However, ancillary plasticizer can be included in the composition in a minor proportion up to 10 percent by weight of the polymer, preferably no more than 5 percent. Non-volatile ester plasticizers, for example, the phosphates, such as tricresyl phosphate, and the phthalates, such as dibutyl phthalate, or the polymeric polyester or alkyd plasticizers can be used.

While the total non-volatile content of the aqueous dispersion paint composition, ordinarily designated as the solids content, can vary widely, it is desirable that the non-volatile content be at least 30 percent by weight in order that a practical amount of paint per coat is applied. The aqueous paint can be satisfactorily formulated in a non-volatile content as great as 70 percent, but at this concentration thinning with water is ordinarily necessary for satisfactory application. The preferred non-volatile content is from about 40 percent to 60 percent by weight.

The viscosity of the aqueous dispersion paint composition also can be varied widely. A stormer viscosity of about 70 to 100 K.U. at 25° C. is a desirable ready-to-apply brush consistency. This is not a critical characteristic as the paint can be further modified satisfactorily with thixotropy-controlling agents to provide the composition with non-drip characteristics with adequate brushout characteristics.

Other auxiliary materials that may be used include: dispersing agents for dispersing and maintaining in a finely divided state the pigments, colors, or extenders, such as aromatic sulfonates condensed with formaldehyde or any of the suitable commercial dispersing agents which are for this purpose, sequestering agents for controlling polyvalent metal ions sometimes introduced by pigments, colors, or extenders, such as complex alkali metal phosphates or ethylene polyaminoacetates, defoaming agents, including waxes, oils, or mineral spirits, or an alkylphenoxyethanol, fatty acid amides, phosphate esters, or a solution of an aimine or amide in an oil; humectants, such as glycol laurate, propylene glycol, diethylene glycol, etc.; thickeners, such as water-soluble gums, water-soluble polyacrylates and methacrylates, water-dispersed starches and proteins, etc.; bactericides and/or fungicides, such as borax, pentachlorophenols, or mercury compounds, perfume-like materials, including neutralizing and masking agents, which are used to overcome odors or to impart pleasant and distinctive odors; other resinous materials in dispersed form, such as alkyd resins, drying oils, or latices of styrene or of styrene and butadiene to cheapen and extend the binders of this invention, and auxiliary corrosion-inhibiting agents; such as powdered zinc, red lead-basic lead silico-chromate, and zinc dust-zinc oxide.

In making water-base paints, the preferred formulations generally fall within the scope of the following tabulation, wherein the percentages indicate the solids content.

| Material | Percent by Weight |
| --- | --- |
| Aqueous dispersed polymer | 10 to 30 |
| Pigment composition | 15 to 55 |
| Stabilizing and dispersing surfactants | 0.1 to 2.5 |
| Bodying or rheology control agent | 0.1 to 5.0 |
| Anti-freeze agent, e.g., ethylene glycol | 0 to 5 |
| Anti-foam agent, e.g., polypropylene glycol | 0 to 2 |
| Fungicidal preservative, e.g., phenyl mercurial salt | 0 to 1.0 |
| Ammonium hydroxide, to pH value 7.5 to 10 | |
| Complex of the formula $M(Z)_xAn$ | 0.2 to 20 mmole/mole of $H_2O$ |
| Water, balance to make 100 | |

As will be noted, the corrosion inhibiting anions are those of weak acids, and the acids have a pK of at least about 4, and preferably are derived from inorganic acids. Anions of strong acids may in fact induce corrosion and form water-soluble compounds of the metal cations M; thus, chlorides, nitrates, sulfates, etc. are excluded. The pigment volume concentration is preferably from 10 percent to 65 percent. The total of the dispersing and stabilizing surfactants is an amount no greater than 10 percent based on the weight of the dispered water-insoluble polymer.

In the following examples, which are illustrative of the invention, the parts and percentages are by weight unless otherwise specifically indicated.

In the examples, the following paints were used:

| Paint I | | |
| --- | --- | --- |
| Material | Pounds | Gallons |
| Water | 28.0 | 3.36 |
| Dispersing agent[1] | 9.9 | 1.08 |
| Wetting agent[2] | 2.2 | 0.25 |
| Defoamer | 2.2 | 0.30 |
| Ethylene glycol | 22.0 | 2.37 |
| Hydroxyethyl cellulose (2% aqueous solution) | 82.0 | 9.88 |
| Germantown lampblack | 6.0 | 0.41 |
| Preservative (100%) | 0.5 | 0.03 |
| Rutile titanium dioxide | 209.4 | 5.98 |

-continued

Paint I

| Material | Pounds | Gallons |
|---|---|---|
| Water-ground mica (325 mesh) | 26.0 | 1.11 |
| Precipitated calcium carbonate | 125.4 | 5.68 |
| Zinc oxide | 6.1 | 0.13 |
| Basic lead silico chromate (Oncor M-50) | 80.0 | 2.34 |
| Acrylic latex[3] (46% solids) | 600.9 | 67.52 |
| Coalescent | 5.0 | 0.62 |
| Defoamer | 2.2 | 0.30 |
| Ammonium hydroxide (28%) | 1.0 | 0.13 |
| | 1208.8 | 101.49 |
| PVC[4] = 35.2% | | |
| Volume solids = 43.7% in paint | | |

[1]Sodium salt of 1:1 mole ratio diisobutylene/maleic anhydride copolymer - 25% aqueous solution.
[2]Benzyl ether of octyl phenol ethylene oxide adduct - 100% active.
[3]Copolymer containing about two-thirds ethyl acrylate, one-third methyl methacrylate, and about 1 percent methacrylic acid.
[4]Pigment volume concentration.

Paint II

| Material | Pounds | Gallons |
|---|---|---|
| Water | 28.0 | 3.36 |
| Dispersing agent[1] | 9.9 | 1.08 |
| Wetting agent[2] | 2.2 | 0.25 |
| Defoamer | 2.2 | 0.30 |
| Ethylene glycol | 22.0 | 2.37 |
| Hydroxyethyl cellulose (2% aqueous solution) | 77.0 | 9.28 |
| Preservative (100%) | 0.5 | 0.03 |
| Rutile titanium dioxide | 198.1 | 5.66 |
| Anatase titanium dioxide | 22.0 | 0.68 |
| Water-ground mica (325 mesh) | 26.5 | 1.13 |
| Precipitated calcium carbonate | 171.8 | 7.78 |
| Zinc oxide | 6.1 | 0.13 |
| Acrylic latex (as in Paint I) | 600.9 | 67.52 |
| Coalescent | 5.0 | 0.62 |
| Defoamer | 2.2 | 0.30 |
| Ammonium hydroxide (28%) | 1.1 | 0.13 |
| | 1175.4 | 100.62 |
| PVC = 34.8% | | |
| Volume solids = 43.9% | | |

[1]Sodium salt of 1:1 mole ratio diisobutylene/maleic anhydride copolymer - 25% aqueous solution.
[2]Benzyl ether of octyl phenol ethylene oxide adduct - 100% active.

Paint III

| Material | With ZnO Pounds | With ZnO Gallons | No ZnO Pounds | No ZnO Gallons |
|---|---|---|---|---|
| Water | 13.1 | 1.57 | 13.1 | 1.57 |
| Dispersing agent[1] | 9.9 | 1.08 | 9.9 | 1.08 |
| Wetting agent[2] | 2.2 | 0.25 | 2.2 | 0.25 |
| Defoamer | 2.2 | 0.30 | 2.2 | 0.30 |
| Ethylene glycol | 22.0 | 2.37 | 22.0 | 2.37 |
| Hydroxyethyl cellulose[3] | 50.0 | 6.0 | 50.0 | 6.0 |
| Germantown lampblack | 6.0 | 0.41 | 6.0 | 0.41 |
| Preservative (100%) | 0.5 | 0.03 | 0.5 | 0.03 |
| Rutile titanium dioxide | 209.4 | 5.98 | 209.4 | 5.98 |
| Water-ground mica (325 mesh) | 22.3 | 0.95 | 26.0 | 1.11 |
| Zinc oxide | 6.9 | 0.15 | — | — |
| Basic lead silico chromate (Oncor M-50) | 80.0 | 2.39 | 80.0 | 2.39 |
| Acrylic latex (as in Paint I) | 688.0 | 77.0 | 688.0 | 77.0 |
| Coalescent | 11.1 | 1.36 | 11.1 | 1.36 |
| Hydroxyethyl cellulose-[3] | 30.0 | 3.0 | 30.0 | 3.0 |
| Defoamer | 2.2 | 0.3 | 2.2 | 0.3 |
| Water | 14.7 | 1.76 | 14.7 | 1.76 |
| | 1170.5 | 104.90 | 1167.3 | 104.90 |
| PVC = 22.2% | | | | |
| Volume solids = 42.3% | | | | |

[1]Sodium salt of 1:1 mole ratio diisobutylene/maleic anhydridecopolymer - 25% aqueous solution.
[2]Benzyl ether of octyl phenol ethylene oxide adduct - 100% active.
[3]2% aqueous solution.

It will be noted in each of the paints, I and III, that in addition to zinc oxide, calcium carbonate is also included.

In cases where the complex $Zn(NH_3)_xCO_3$ is prepared beforehand, the following ingredients are mixed at room temperature. When the solution is clear, the complex has been formed. Here "x" would normally be 4, but could be as low as 2 is the complexing is not complete; e.g., when insufficient complexing agent such as ammonia is present.

| | |
|---|---|
| 14 gms. | $(NH_4)_2CO_3$ |
| 15.9 gms. | (28% $NH_3$) |
| 58.5 gms. | $H_2O$ |
| 11.8 gms. | ZnO |

In the following examples, data are presented which were obtained by using the test methods listed below:

1. Flash Rust Resistance
   a. Substrate—rusty cold rolled steel, mechanically wire brushed.
   b. Test paints are brush applied—3 gms. per 48 sq. inches.
   c. Test paint on the panel is dried at 72° F., 90% R.H. for 1 hour.
   d. Panels are rated for percent rust bleeding.
2. Maintenance Testing (long term)
   a. Substrates—clean cold rolled steel, rusty cold rolled steel, mechanically wire brushed.
   b. Procedure—two brush applied coats (each 3 gms. per 48 sq. inches) over clean cold rolled steel, three brush applied coats (first coat 4 gms. per 48 sq. inches, second and third 3 gms.) over wire brushed rusty cold rolled steel. One hour air dry between coats. Seven day air dry before exposure to 5 percent salt spray.
   c. Rating system—panels are rated for blistering-rust bleeding (for example 7MD-50).
   Blistering—number indicates blister size. Range is from 10 to 2 with 10 indicating no blisters. Letter indicates blister density; F-Few, M-Medium, MD-Medium Dense, D-Dense (e.g., 7MD in above example).
   Rust Bleeding—number indicates percent rust bleeding (e.g., 50 in above example).

EXAMPLE 1

This demonstrates improved flash rust resistance combined with poor maintenance properties of some soluble corrosion inhibiting salts.

1. Flash Rust Resistance

| | Lbs. of Added Salt[1]/100 Gal. | Percent Flash Rusting[2] |
|---|---|---|
| Paint I | None | 75 |
| plus sodium carbonate | 7.72 | 40 |
| plus sodium nitrite | 5.0 | 40 |
| plus sodium carbonate | 15.45 | 10 |
| plus sodium nitrite | 10.0 | 30 |

[1]Salts were added on an equivalence basis, 5# $NaNO_2$ = 7.72# $Na_2CO_3$, etc.
[2]Low numbers best.

|  | Lbs. of Added Salt[1]/100 Gal. | Blistering[2]-Rust Bleeding[3] (1 Week Exposure to 5% NaCl Spray) | |
|---|---|---|---|
|  |  | Clean Cold Rolled Steel | Rusty Cold Rolled Steel |
| Paint I | None | 10-2 to 10 | 9M to 8MD-25 to 35 |
| plus sodium carbonate | 7.72 | 6M-20 | 8M-90 |
| plus sodium nitrite | 5.0 | 8F-10 | 8MD-75 |
| plus sodium carbonate | 15.45 | 6M-20 | 8M-90 |
| plus sodium nitrite | 10.0 | 7MD-50 | 8MD-75 |

[1]Salts were added on an equivalence basis, 5# $NaNO_2$ = 7.72# $Na_2CO_3$, etc.
[2]9F to 10 best.
[3]Low numbers best.

It will be noted that although these prior art materials improve flash rust resistance, blistering and rust bleeding are increased.

EXAMPLE 2

This demonstrates the minor effect of insoluble basic lead silico-chromate, a prior art inhibitor, on flash rust resistance.

|  | Percent Flash Rusting[1] |
|---|---|
| Paint I (80 lbs. inhibitor) | 75 |
| Paint II (no inhibitor) | 85 |

[1]Low numbers best.

EXAMPLE 3

This demonstrates that $Zn(NH_3)_xCO_3$ gives similar flash rust resistance with improved maintenance properties relative to a soluble inhibitory salt, here, x is typically 2 to 4, depending on the quantity of ammonia.

1. Flash Rust Resistance

|  | Lbs. of Added Salt/100 Gal.[2] | Percent Flash Rusting[3] |
|---|---|---|
| Paint I | None | 75 |
| plus zinc ammonium carbonate in complex form | 18.2 | 2 |
| plus sodium carbonate | 15.5 | 10 |

[2]Salts were added on an equivalence basis, 18.2# zinc ammonium carbonate = 15.5# $Na_2CO_3$
[3]Low numbers best.

2. Maintenance Testing

|  | Lbs. of Added Salt[2]/100 Gal. | Blistering[3]-Rust Bleeding[4] (1 Week Exposure to 5% NaCl Spray) | |
|---|---|---|---|
|  |  | Clean Cold Rolled Steel | Rusty Cold Rolled Steel |
| Paint I | None | 10-2 to 10 | 9M to 8MD 25 to 35 |
| plus zinc ammonium carbonate complex plus sodium carbonate | 18.2 | 10-2 | 9M-40 |
| plus zinc ammonium carbonate | 15.5 | 6M-20 | 8M-90 |

[3]9F to 10 best;
[4]Low numbers best.

It is theorized that the mechanism for the improved maintenance propertied lies in the decreased water solubility of the $ZnCO_3$-amine complex as the paint film dries. On drying of the paint film, it is believed that the complexing agent (in this case $NH_3$) evaporates leaving a relatively insoluble salt (here $ZnCO_3$).

To demonstrate this, a controlled volume of the $Zn(NH_3)_xCO_3$ solution (30 ml.) of known concentration (18.2% by weight $ZnCO_3$) was air dried and the weight of the solid measured (6.15 gms.). The solid was then resuspended to the same initial volume (30 ml.). The suspension was stirred and equilibrated for about one week under ambient conditions. It was then filtered and the weight of the remaining solid measured (5.99 gms.). The difference between the initial weight (6.15 gms.) and the weight of the solid remaining after filtration (5.99 gms.) is, of course, the amount dissolved (0.16 gms.). The amount redissolved amounts to a few percent of the initial solid (2.6 percent). This shows that the $Zn(NH_3)_xCO_3$ is not soluble (to an appreciable extent) after it had been air dried and the $NH_3$ volatilized. The difference in the initial weight of the solid $ZnCO_3$ between the actual value (6.15 gms.) compared with the theoretical amount (5.46 gms.) is probably due to some of the $NH_3$ remaining complexed with the solid $ZnCO_3$. The initial weight (6.15 gms.) was obtained (within experimental error) regardless of whether the solution was dried under ambient conditions or at 140° F. overnight.

The invention is not limited to this or other hyphothesis or theories mentioned herein.

As described in the texts "Ionic Equilibria," Hogness and Johnson (1954 Ed.) Henry Holt and Company and in the text "Fundamentals of Chemistry", Brescia et al (1970 Ed.) Acad. Press, it is generally the case that the coordination number of a metal atom, whether in the zero-valent or ionic-valent state, has a coordination number which is twice the possible ionic charge of the metal atom, and the coordination number is never more than 3 times the ionic charge of a given metal atom. Accordingly, as is known in the art of coordination chemistry, the coordination number of the useful common metal atoms ranges from 2 to 6.

EXAMPLE 4

This illustrates the positive effect of an ion (multivalent cation) on maintenance properties. The Zn ion is formed from the partial dissociation of the $Zn(NH_3)_x$ complex. This complex may be directly added to the paint as a solution or formed from a combination of ZnO pigment plus $NH_3$, plus a source of carbonate.

| | Blistering[1]-Rust Bleeding[2] (1 Week Exposure in 5% NaCl Spray) | |
|---|---|---|
| | Clean Cold Rolled Steel | Rusty Cold Rolled Steel |
| Paint III (no ZnO) | 9D-50 | 8MD-70 |
| Paint III (with 6.9 ZnO) | 10-2 | 9MD-40 |
| Paint III (no ZnO but 18.1# of $Zn(NH_3)_xCO_3$ in complex form | 10-5 | 9MD-50 |

[1]9F to 10 best.
[2]Low numbers best.

EXAMPLE 5

This example shows the use of an ammonium salt in combination with ZnO in the paint to form $Zn(NH_3)_xCO_3$ in situ. An ammonium salt capable of forming the complex vs. a sodium salt which cannot form the complex are used.

1. Flash Rust Resistance

| | Lbs. of Added Salt [1]/100 Gal. | Percent Flash Rusting[2] |
|---|---|---|
| Paint I (contains ZnO) | None | 75 |
| plus ammonium carbonate | 14 | 2 |
| plus sodium carbonate | 15.5 | 10 |

[1]Salts were added on an equivalence basis, 14# ammonium carbonated = 15.5# $Na_2CO_3$.
[2]Low numbers best.

2. Maintenance Testing

| | Lbs. of Added Salt[1]/100 Gal. | Blistering[2]-Rust Bleeding[3] (1 Week Exposure to 5% NaCl Spray) | |
|---|---|---|---|
| | | Clean Cold Rolled Steel | Rusty Cold Rolled Steel |
| Paint I (contains ZnO) | None | 10-2 to 10 | 9M to 8MD-25 to 35 |
| plus ammonium carbonate | 14 | 10-0 | 8M-40 |
| plus sodium carbonate | 15.5 | 6M-20 | 8M-90 |

[1]Salts were added on an equivalence basis, 14# ammonium carbonated = 15.5# $NaCO_3$.
[2]9F to 10 best.
[3]Low numbers best.

EXAMPLE 6

This shows the necessity of ZnO when adding $(NH_4)_2CO_3$.

| | Blistering[1]-Rust Bleeding[2] (1 Week Exposure in 5% NaCl Vapor) | |
|---|---|---|
| | Clean Cold Rolled Steel | Rusty Cold Rolled Steel |
| Paint III (with ZnO) | 10-2 | 9MD-40 |
| plus 14# $(NH_4)_2CO_3$ | 10-5 | 9MD-40 |
| Paint III (no ZnO) | 9D-50 | 8MD-70 |
| plus 14# $NH_4)_2CO_3$ | 9MD-60 | 8MD-100 |

[1]9F to 10 best.
[2]Low numbers best.

The determination of the maintenance properties of rust bleed through and blistering were obtained by conventional high humidity at elevated temperatures for several hundred hours and by the conventional salt spray test.

We claim:

1. In a method of maintenance painting clean or rusty ferrous metal, the steps of applying one or more coats, to a coated or uncoated ferrous surface, of a corrosion-inhibiting aqueous latex paint containing a synthetic or natural polymer dispersed therein, said polymer consisting essentially of one being insoluble in an aqueous system at a pH of between about 3 and 11, any unsaturated acid monomer contained in said polymer being present in an amount of less than 5% of the monomers, and, dissolved in said paint, a water-soluble complex of a polyvalent metal, a volatile complexing agent, and a corrosion-inhibiting anion, said complex having the formula $M(Z)_xAn$, wherein M is a polyvalent metal cation, An is a corrosion-inhibiting anion, Z is a complexing volatile component, and x is the number of moles of volatile complexing agent per mole of M and being from 2 to 6, M and An being such that upon evaporation of the volatile complexing agent, M and An form an insoluble corrosion-inhibiting material, in which the quantity of said complex is from about 0.2 to about 20 millimoles per mole of water in the latex paint, the polymer on a solids basis being present in an amount of 10 to 30%, in which a pigment is present in an amount of 15 to 55%, said pigment including at least one metal oxide, at least one dispersant or surfactant being present in an amount of 0.1–2.5%, in which a bodying agent is present in an amount of 0.1–5%, and in which water and any optional ingredients are present in an amount to make the total of the ingredients 100%, all parts being by weight unless otherwise stated, and air-drying the coating, whereby the ferrous metal is protected from flash rusting and, upon evaporation of the volatile complexing agent, is provided with long-term rust resistance and blistering resistance by the insoluble complex of M and An, the latex pH being alkaline.

2. The method of claim 1 in which M is one or more of Ni, Cu, Zn, Sc, Ti, V, Zr, Pd, Mn, Cd, Fe, or Co, in which An is one or more of $CO_3^=$, $PO_4^{-=}$, $HPO_4^=$, $WO_4^=$, $MoO_4^=$, $C_6H_5COO^=$, $SiO_3^=$, $B_4O_7^=$, or $CrO_4^=$, and in which Z is $:NR_3$ where the R groups are the same or different and are hydrogen, alkyl or hydroxyalkyl having from 1 to 4 carbon atoms, $:OR_2$ where the R groups are the same or different and are as above, or $:SR_2$ where the R groups are the same or different and are as above.

3. The method of claim 2 in which M is Zn, Cd, Co, Ni, Cu, or Zr, Z is ammonia or a volatile amine, and An is $CO_3^=$, $MoO_4^=$ or $C_6H_5COO^-$, said paint having a pH of 7.5 to 10.

4. The method of claim 3 in which M is Zn and Z is ammonia, said pigment including zinc oxide.

5. The method of claim 1 in which the paint is based on an emulsion polymer of addition polymerized unsaturated compounds.

6. The method of claim 4 in which the paint is based on a polymer from the group consisting of at least one of a polymer of a vinyl ester of an aliphatic acid having from 1 to 18 carbon atoms, a copolymer thereof with one or more other unsaturated monomers, a polymer of an acrylic acid ester or methacrylic acid ester of an alcohol having 1 to 18 carbon atoms, a copolymer thereof with one or more other unsaturated monomers, polymerized unsaturated hydrocarbons, and copolymers thereof with one or more other unsaturated monomers.

7. The method of claim 3 in which the polymer is a water insoluble acrylic polymer dispersed in water.

8. The method of claim 4 in which the polymer is a water insoluble acrylic polymer dispersed in water.

9. A ferrous article made by the method of claim 1.

10. A ferrous article made by the method of claim 2.

11. A ferrous article made by the method of claim 3.

12. A ferrous article made by the method of claim 4.

13. A ferrous article made by the method of claim 5.

14. A ferrous article made by the method of claim 6.

15. The method of claim 8 in which the latex incorporated in the paint contains ammonium carbonate, and the zinc to form the zinc ammonium carbonate complex is supplied by the zinc oxide pigment, whereby the complex is formed in situ in the dispersion.

16. The method of claim 15 in which the paint contains calcium carbonate.

* * * * *

UNITED STATES PATENT AND TRADEMARK OFFICE
CERTIFICATE OF CORRECTION

PATENT NO. : 4,243,416
DATED : January 6, 1981
INVENTOR(S) : MARTIN J. GROURKE, ET AL It is certified that error appears in the above—identified patent and that said Letters Patent is hereby corrected as shown below:

Col. 2, line 38, change "01." to --0.1--.

Col. 6, line 34, change "swelling" to --swellable--.

Col. 9, line 60, change "cellulose$^{-3}$" to --cellulose$^3$--.

Col. 9, line 65, change "anhydridecopolymer" to --anhydride copolymer--.

Col. 12, line 14, change "propertied" to --properties--.

Signed and Sealed this

Eighth Day of December 1981

[SEAL]

Attest:

Attesting Officer

GERALD J. MOSSINGHOFF
Commissioner of Patents and Trademarks